April 22, 1952  T. B. WALKER  2,593,707
FILTER

Filed July 22, 1949  2 SHEETS—SHEET 1

Inventor
Thomas Bradley Walker
By

April 22, 1952  T. B. WALKER  2,593,707
FILTER

Filed July 22, 1949  2 SHEETS—SHEET 2

Inventor
Thomas Bradley Walker
By

Patented Apr. 22, 1952

2,593,707

UNITED STATES PATENT OFFICE 2,593,707

FILTER

Thomas Bradley Walker, Kendal, England, assignor to Isaac Braithwaite & Son Engineers Limited, Kendal, England, a corporation of Great Britain Application July 22, 1949, Serial No. 106,160
In Great Britain August 3, 1948

2 Claims. (Cl. 210—200)

This invention relates to filters and particularly to improvements in filters of the type using a filter-aid such as diatomaceous earth which is deposited on the surface of a supporting medium thereby forming a filter bed, such filters being used for filtering the white or similar spirit or the chlorinated solvents employed in machines for the dry cleaning of clothing and other textile materials for the removal of the dirt particles from the spirit so that it can be re-used in the machine and also for filtering detergents employed in machines for the washing of clothing and other textiles in a laundry for the removal of dirt particles from the detergent so that it can be re-used in the machine.

The objects of the invention are to obtain an even distribution of the filter aid on the surface of the supporting medium whereby an even filter bed is produced, to cause the filter bed to fall away from the supporting medium at the end of the filtering operation and to maintain the sludge formed when the filter bed and the dirt collected thereby falls away from the supporting medium in a condition enabling it to be discharged from the filter tank through a pipe.

The aforesaid objects are achieved according to the invention by rotating the filter and supporting medium in a suitable vessel to which the liquid to be filtered is supplied, agitating the liquid by suitable means rotating with the supporting medium to keep the filter aid in suspension whilst it is being deposited on the supporting medium to form the filter bed and causing an equalisation of the pressure of the two sides of the supporting medium at the end of the filtering operation whereby the filter bed will fall away from the supporting medium and the sludge formed will be kept in a condition enabling it to be discharged through a pipe by the agitating means rotating with the supporting medium.

The invention is illustrated in and will be described with reference to the accompanying drawings which show two forms of the invention. In both of these forms the liquid in the filter tank is under atmospheric pressure, the tank being an open top one, but it is to be understood that the tank may be closed and the liquid to be filtered contained in it be forced through the filter under pressure. In the drawings.

In both forms of the invention the filter tank A, the bottom of which is preferably semi-cylindrical as shown, carries a stationary hollow shaft B on which is mounted a series of filter aid support E. The shaft B is provided at each end with a flange C having a projection $c^1$ which serves to locate the shaft B with the filter aid support assembly thereon in the tank, each projection $c^1$ resting on a flat formed on a flange D secured to the end of the tank.

The flanges C and D of each pair are bolted together to form a liquid tight joint and a pipe $d^1$ is screwed into the flange D at one end, the flange D at the other end being closed by a plug $d^2$. Alternatively a pipe may be screwed into the flanges D at both ends.

The filter aid supports are formed by a series of pairs of discs E formed by perforated plates $e^1$ covered externally by fine mesh wire gauze sheets $e^2$. The discs E are riveted or otherwise secured to bosses $e^3$ which are free to rotate on the shaft B, adjacent bosses being coupled together by driving pins $e^4$ and the whole assembly of supports being rotated at a slow speed by suitable means for example by a chain drive to a sprocket wheel G secured to one of the end bosses $e^3$.

A sealing device H mounted in a recess in each end boss prevents leakage of liquid between the disc assembly and the shaft B and a similar seal device $H^1$ mounted in a recess in each flange C prevents leakage between these flanges and the shaft B.

An overflow pipe O is provided near the top of the tank A and a sludge discharge pipe P at or near the bottom thereof.

Figure 1:
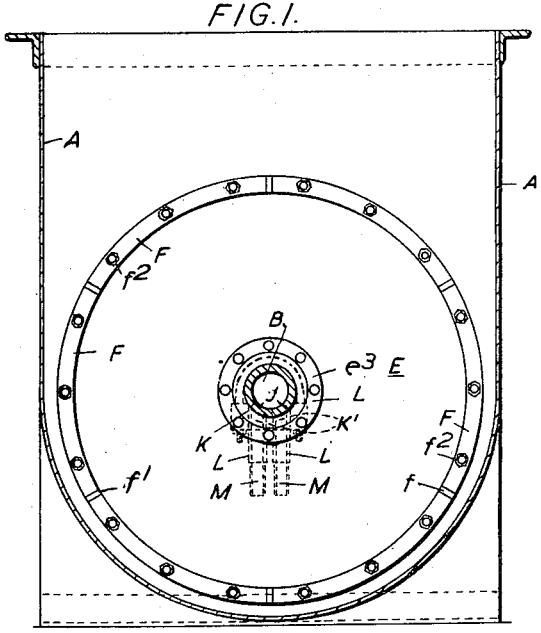
Fig. 1 is a vertical transverse section of one form of the invention.
Figure 2:
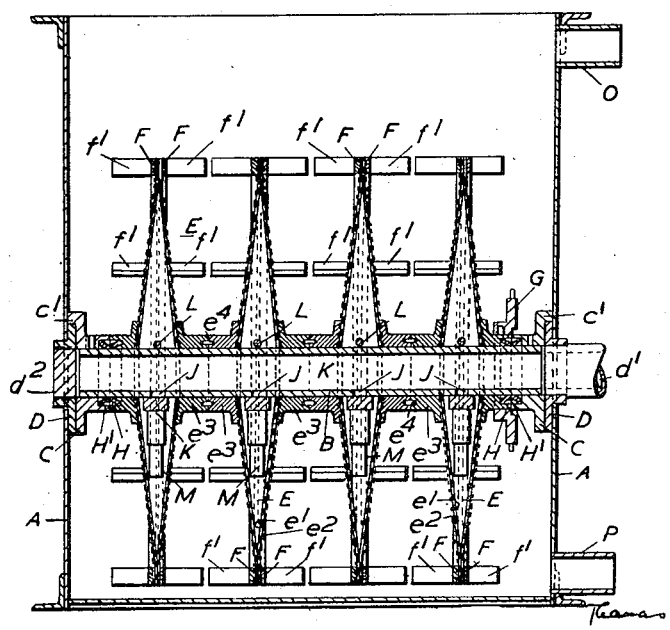
Fig. 2 is a vertical longitudinal section thereof.

In the form of the invention shown in Figs. 1 and 2 the perforated plates $e^1$ are dished so that when each pair of plates is assembled they form an annular chamber, which tapers from the centre to the periphery. The plates $e^1$ of each pair with their covering of gauze $e^2$ are clamped together at their peripheries by rings F secured together by bolts $f^2$. The rings F carry a number of lateral paddles $f^1$.

A saddle K is clamped by means of a U bolt L onto the shaft B in the interior of each of the annular chambers formed by each of the pairs of discs E. The saddle K is formed with two holes $k^1$ each of which communicates with a corresponding hole J in the stationary hollow shaft B and a depending tube M, open at its lower end, is secured in each of the holes $k^1$.

Figure 3:
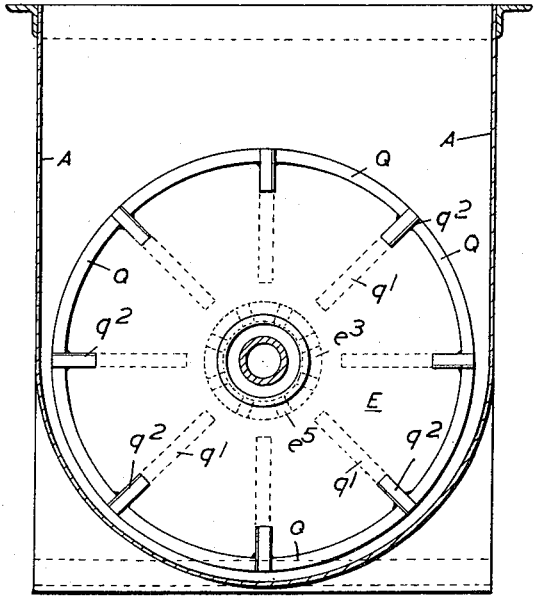
Fig. 3 is a vertical transverse section of a second form of the invention.
Figure 4:
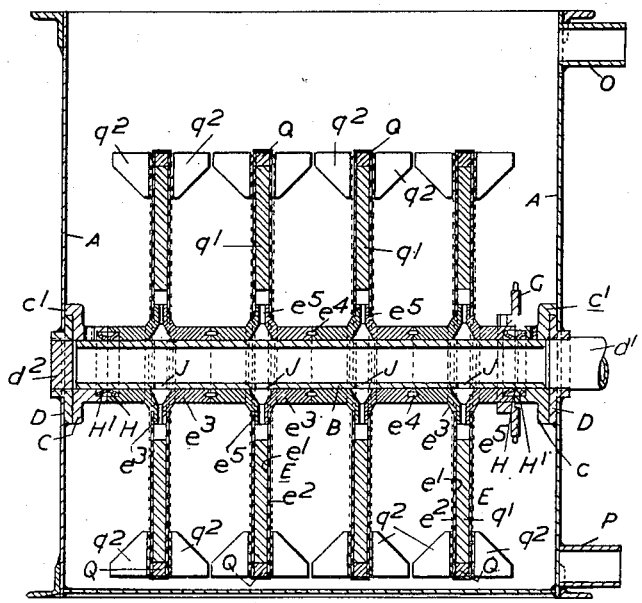
Fig. 4 is a vertical longitudinal section thereof.

In the form of the invention shown in Figs. 3 and 4 each pair of discs E, instead of being dished and arranged to form a tapered annular chamber, are flat and arranged to form a cylindrical chamber, each pair of discs being carried by a single boss $e^3$. A ring Q is arranged between the discs of each pair at the peripheries thereof, the discs being bolted or otherwise secured to the ring. The ring Q carries a number of radial ribs $q^1$ extending radially towards the boss $e^3$. A number of laterally extending paddles $q^2$ are bolted through the discs E to the ring Q and the ribs $q^1$.

The interior of the shaft B is in communication with the cylindrical chamber between the two discs E by holes J which communicate with radial ports $e^5$ in the boss $e^3$.

Although the tank A shown in the drawings is rectangular above the shaft center line with a view to easy insertion of the disc assembly, it is to be understood that the tank may be made partially or wholly cylindrical without affecting the operation of the filter. Moreover, the wire gauze $e^2$ may be replaced by a woven fabric, such as nylon, or a coarse mesh gauze may be employed to carry the woven fabric. It is to be understood that although four pairs of discs are shown in the drawings, the invention is not limited to such number as fewer or more may be used according to the flow rate required, and the diameter of the discs.

The operation of the filter is as follows:

The liquid to be filtered is run into the tank, for example, from a cleaning machine, until the whole disc assembly is covered. The discs E are then rotated and the necessary quantity of filter aid is put in the liquid. A partial vacuum is then created in the chamber between the discs of each pair and in the hollow shaft by, for example, a vacuum pump connected to pipe $d^1$. This causes the liquid to be drawn through the discs and the filter aid to build up onto the outer surface of the gauze $e^2$ thereby forming a filter bed which owing to the agitation of the liquid by the paddles $f^1$ or $q^2$ will be of even thickness over the whole surface of the gauze. The filter bed so formed will collect the dirt particles in the liquid as the latter passes through the discs. The liquid to be filtered flows continuously to the tank A and passes through the filter until the end of the process or until the amount of dirt accumulated on the filter bed slows down the flow rate excessively, at which point the flow into the tank A is stopped.

When the flow to the tank A is stopped the flow through the filtering disc continues with a falling liquid level in the tank and as the intake to the hollow shaft B is through the pipes M (Figs. 1 and 2) or the ports $e^5$ (Figs. 3 and 4) the level of liquid will fall until the point of entry into these pipes or ports is reached, and there is then left in the tank a relatively small quantity of unfiltered liquid. If now the vacuum pump connected to the shaft A is stopped, or the vacuum broken by any other means, the pressures on the two sides of the filter discs E will be equalised and the filter bed will immediately fall away from the discs leaving a mixture of liquid, filter aid and dirt in the tank which by reason of the action of the paddles is kept in a condition in which it can be drawn off through pipe P. When the tank is empty the filter is again ready for the next run.

I claim:

1. A filtering apparatus, comprising in combination, a tank for receiving a liquid to be filtered and a filtering aid; a stationary hollow shaft mounted in said tank; at least one hollow filter means rotatably mounted on said shaft immersed in said liquid and formed with an annular inner chamber, said filter means including a pair of perforate filter discs spaced apart and forming side walls of said annular chamber, said annular chamber communicating with the interior of said hollow shaft; agitating members secured to said filter means for rotation therewith and projecting therefrom into said liquid; means for rotating said filter means; and means for reducing the pressure in the interior of said hollow shaft so that reduced pressure in said hollow shaft and in said annular chamber first causes said filtering aid contained in said liquid agitated by said agitating members to uniformly adhere to said perforate discs, and then causes said liquid to be drawn through said adherent filtering aid into said chambers so as to be filtered.

2. A filtering apparatus, comprising in combination, a tank for receiving a liquid to be filtered and a filtering aid; a stationary hollow shaft mounted in said tank; at least one hollow filter means rotatably mounted on said shaft immersed in said liquid and formed with an annular inner chamber, said filter means including a pair of parallel perforate filter discs spaced apart and forming side walls of said annular chamber; conduit means located inside said filter means and communicating at one end thereof with said interior of said hollow shaft and having a free end located in said annular chamber spaced from the perimeter of said discs and from said hollow shaft; agitating members secured to said filter means for rotation therewith and projecting therefrom into said liquid; means for rotating said filter means; and means for reducing the pressure in the interior of said hollow shaft so that reduced pressure in said hollow shaft and in said annular chamber first causes said filtering aid contained in said liquid agitated by said agitating members to uniformly adhere to said perforate discs, and then causes said liquid to be drawn through said adherent filtering aid into said chambers so as to be filtered.

THOMAS BRADLEY WALKER.

REFERENCES CITED

The following references are of record in the file of this patent:

UNITED STATES PATENTS

| Number | Name | Date |
| --- | --- | --- |
| 403,073 | Rabitz | May 7, 1889 |
| 1,264,635 | Graham | Apr. 30, 1918 |
| 1,469,026 | Silvester | Sept. 25, 1923 |
| 1,533,032 | Sauer | Apr. 7, 1925 |
| 1,627,343 | Sauer | May 3, 1927 |

FOREIGN PATENTS

| Number | Country | Date |
| --- | --- | --- |
| 291,316 | Germany | Apr. 13, 1916 |
| 599,791 | Germany | July 9, 1934 |
| 843,982 | France | Apr. 11, 1939 |
| 880,803 | France | Jan. 11, 1943 |